(12) United States Patent
Hirata et al.

(10) Patent No.: US 7,614,213 B2
(45) Date of Patent: Nov. 10, 2009

(54) ENGINE EXHAUST EMISSION PURIFICATION APPARATUS

(75) Inventors: Kiminobu Hirata, Ageo (JP); Hisashi Akagawa, Ageo (JP); Shuichi Nakamura, Ageo (JP); Hiroki Ueno, Ageo (JP); Ikuo Sakai, Ageo (JP)

(73) Assignee: Nissan Diesel Motor Co., Ltd., Ageo-shi (JP)

( * ) Notice: Subject to any disclaimer, the term of this patent is extended or adjusted under 35 U.S.C. 154(b) by 157 days.

(21) Appl. No.: 10/572,573

(22) PCT Filed: Sep. 17, 2004

(86) PCT No.: PCT/JP2004/013608

§ 371 (c)(1),
(2), (4) Date: Nov. 7, 2006

(87) PCT Pub. No.: WO2005/028827

PCT Pub. Date: Mar. 31, 2005

(65) Prior Publication Data

US 2007/0092413 A1    Apr. 26, 2007

(30) Foreign Application Priority Data

Sep. 19, 2003    (JP)    ............................... 2003-327295
Sep. 30, 2003    (JP)    ............................... 2003-341588

(51) Int. Cl.
*F01N 3/00*    (2006.01)
(52) U.S. Cl. ............................. 60/286; 60/277; 60/295; 60/303
(58) Field of Classification Search ................... 60/277, 60/285, 286, 295, 303, 324; 50/277, 285, 50/286, 295, 303, 324
See application file for complete search history.

(56) References Cited

U.S. PATENT DOCUMENTS 3,556,734  A        1/1971  Peterson
4,557,108  A  *  12/1985  Torimoto ..................... 60/286

(Continued)

FOREIGN PATENT DOCUMENTS

DE            19855338           6/2000

(Continued)

*Primary Examiner*—Tu M Nguyen
(74) *Attorney, Agent, or Firm*—McDermott Will & Emery LLP

(57) ABSTRACT

An engine exhaust emission purification apparatus for reducing and purifying NOx in the exhaust emission by using a liquid reducing agent having a temperature maintenance device for maintaining a temperature of at least a part of a liquid reducing agent supply system configured by an injection nozzle and piping of the injection nozzle at a temperature lower than a boiling point of a solvent of the liquid reducing agent or equal to or higher than a melting point of dissolved matter in which the liquid reducing agent existing in the liquid reducing agent supply system conducts heat exchange with the liquid reducing agent supply system thereby being maintained at a temperature lower than the boiling point of the solvent or equal to or higher than the melting point of the dissolved matter and resultantly, occurrence of precipitation of the dissolved matter due to evaporation of only the solvent in the liquid reducing agent supply system does not occur, and even If precipitation of the dissolved matter occurs, the dissolved matter per se is melt away to prevent an injection hole of the injection nozzle from being clogged.

6 Claims, 13 Drawing Sheets

U.S. PATENT DOCUMENTS

| | | | |
|---|---|---|---|
| 5,116,579 A | 5/1992 | Kobayashi et al. | |
| 5,140,814 A | 8/1992 | Kreutmair et al. | |
| 5,176,325 A | 1/1993 | Vidusek | |
| 5,372,312 A | 12/1994 | Vidusek | |
| 5,431,893 A | 7/1995 | Hug et al. | |
| 5,553,783 A | 9/1996 | Slavas et al. | |
| 5,601,792 A | 2/1997 | Hug et al. | |
| 5,603,453 A | 2/1997 | Weaver et al. | |
| 5,605,042 A * | 2/1997 | Stutzenberger | 60/286 |
| 5,606,856 A | 3/1997 | Linder et al. | |
| 5,832,720 A | 11/1998 | Svahn | |
| 5,884,475 A * | 3/1999 | Hofmann et al. | 60/274 |
| 5,974,789 A | 11/1999 | Mathes et al. | |
| 5,992,141 A | 11/1999 | Berriman et al. | |
| 6,041,594 A | 3/2000 | Brenner et al. | |
| 6,050,088 A | 4/2000 | Brenner | |
| 6,098,896 A | 8/2000 | Haruch | |
| 6,167,698 B1 | 1/2001 | King et al. | |
| 6,192,677 B1 * | 2/2001 | Tost | 60/286 |
| 6,260,353 B1 | 7/2001 | Takahashi | |
| 6,279,603 B1 | 8/2001 | Czarnik et al. | |
| 6,382,600 B1 | 5/2002 | Mahr | |
| 6,513,323 B1 * | 2/2003 | Weigl et al. | 60/286 |
| 6,539,708 B1 * | 4/2003 | Hofmann et al. | 60/286 |
| 6,755,017 B2 | 6/2004 | Katashiba et al. | |
| 6,814,303 B2 | 11/2004 | Edgar et al. | |
| 6,912,846 B2 | 7/2005 | Huber et al. | |
| 7,168,241 B2 * | 1/2007 | Rudelt et al. | 60/286 |
| 2004/0045284 A1 | 3/2004 | Ripper et al. | |
| 2007/0240405 A1 * | 10/2007 | Nishina et al. | 60/286 |
| 2008/0295500 A1 * | 12/2008 | Cox et al. | 60/295 |

FOREIGN PATENT DOCUMENTS

| | | |
|---|---|---|
| DE | 19946901 | 4/2001 |
| DE | 10060808 | 7/2002 |
| EP | 0886043 | 12/1998 |
| JP | 64000311 | 1/1989 |
| JP | 02-173311 | 7/1990 |
| JP | 02-218418 | 8/1990 |
| JP | 02-223624 | 9/1990 |
| JP | 02-223625 | 9/1990 |
| JP | 03-129712 | 6/1991 |
| JP | 03-242415 | 10/1991 |
| JP | 04-237860 | 8/1992 |
| JP | 04-292565 | 10/1992 |
| JP | 05-171921 | 7/1993 |
| JP | 05-222923 | 8/1993 |
| JP | 05-302509 | 11/1993 |
| JP | 06-007643 | 1/1994 |
| JP | 07-127503 | 5/1995 |
| JP | 07-279650 | 10/1995 |
| JP | 8-193511 | 7/1996 |
| JP | 8-210124 | 8/1996 |
| JP | 9-509890 | 10/1997 |
| JP | 9-511807 | 11/1997 |
| JP | 10-121949 | 5/1998 |
| JP | 11-294145 | 10/1999 |
| JP | 2000-027627 | 1/2000 |
| JP | 2000-257419 | 9/2000 |
| JP | 2000-314308 | 11/2000 |
| JP | 2001-020724 | 1/2001 |
| JP | 2001-027112 | 1/2001 |
| JP | 2001-050035 | 2/2001 |
| JP | 2001-173431 | 6/2001 |
| JP | 2001-523165 | 11/2001 |
| JP | 2002-004840 | 1/2002 |
| JP | 2002-030927 | 1/2002 |
| JP | 2002-155732 | 5/2002 |
| JP | 2002-513109 | 5/2002 |
| JP | 2002-188431 | 7/2002 |
| JP | 2002-221024 | 8/2002 |
| JP | 2002-525491 | 8/2002 |
| JP | 2002-531743 | 9/2002 |
| JP | 2002-332825 | 11/2002 |
| JP | 2003-010644 | 1/2003 |
| JP | 2003-10644 | 1/2003 |
| JP | 2003-239727 | 8/2003 |
| JP | 2003-260332 | 9/2003 |
| JP | 2003-328734 | 11/2003 |
| JP | 2002-097940 | 4/2004 |
| JP | 2004-044405 | 12/2004 |
| WO | WO 96-08639 | 3/1996 |
| WO | WO 99-30811 | 6/1999 |
| WO | WO 99/55445 | 11/1999 |
| WO | WO 03-018177 | 3/2003 |

* cited by examiner

ENGINE EXHAUST EMISSION PURIFICATION APPARATUS

This is a continuation of the PCT/JP2004/013608, Application filed on Sep. 17, 2004.

BACKGROUND OF THE INVENTION

1. Field of the Invention

The present invention relates to an engine exhaust emission purification apparatus for reducing and purifying nitrogen oxides (NOx) in an exhaust emission by using a liquid reducing agent (hereafter referred to as "exhaust emission purification apparatus") and particularly to a technology for rarely causing clogging of an injection hole of an injection nozzle for the liquid reducing agent.

2. Description of the Related Art

As an exhaust emission purification system for purifying NOx included in an engine exhaust emission, there has been proposed an exhaust emission purification apparatus as disclosed in Japanese Patent Application Laid-open No. 2000-27627.

In this exhaust emission purification apparatus, a reduction catalytic converter is disposed in an exhaust system of the engine, a reducing agent is supplied by injection to an exhaust emission at a position upstream of the reduction catalytic converter, and NOx in the exhaust emission is subjected to reaction with the reduction agent in the reduction catalytic converter for purifying the exhaust emission by converting the NOx into harmless components. The reducing agent is stored in a storage tank in a liquid state at room temperature and is injected and supplied from an injection nozzle in a required amount corresponding to an operating state of the engine. At this stage, as the reducing agent, a liquid reducing agent such as a urea aqueous solution, an ammonia aqueous solution, and diesel oil having hydrocarbon as main components is used.

However, with the conventional exhaust emission purification apparatus, the injection hole of the injection nozzle might be clogged during the supply of the liquid reducing agent by injection and the injection for supplying the liquid reducing agent will become impossible in some cases. As a result, the reduction reaction of NOx in the reduction catalytic converter would not proceed to result in emission of the NOx before it is purified and therefore, it might become impossible to obtain a required performance for the exhaust emission purification. It is assumed that this problem is caused by such a phenomenon that only a solvent evaporates and the dissolved matter of the liquid reducing agent is precipitated in the injection nozzle when a temperature of the injection nozzle increases under an influence of exhaust heat and a temperature of the liquid reducing agent increases to or over a boiling point of the solvent.

In the injection nozzle, when the temperature of the liquid reducing agent increases to or over the boiling point of the solvent and the dissolved matter is precipitated and when the temperature further increases over a melting point of the dissolved matter, the dissolved matter melts and therefore the clogging of the injection hole is expected to be cancelled.

On the other hand, at a portion less susceptible to the heat of exhaust emission, e.g., piping for supplying the liquid reducing agent to the injection nozzle, a temperature increases to or over the boiling point of the solvent but may not increase to or over the melting point of the dissolved matter. In this case, the dissolved matter remains precipitated in the injection nozzle and the piping for the nozzle, and therefore it becomes impossible to make an injection supply of the liquid reducing agent from the injection nozzle. As a result, exhaust emission purification by the reduction catalytic converter may become insufficient to resultantly cause emission of a large amount of NOx. Such a problem becomes prominent especially when the injection supply of the liquid reducing agent stop under a condition where the temperatures of the injection nozzle and the piping for the nozzle equal to or higher than the boiling point of the solvent or when an amount of liquid reducing agent supplied by injection is small.

SUMMARY OF THE INVENTION

Therefore, taking into account the above problems of the conventional apparatus, it is an object of the present invention to provide an exhaust emission purification apparatus in which clogging of an injection hole of an injection nozzle may be prevented by maintaining a temperature of at least a part of a liquid reducing agent supply system provided with an injection nozzle and piping for the nozzle at a temperature lower than a boiling point of a solvent or equal to or higher than a melting point of dissolved matter.

Therefore, in accordance with the present invention, there is provided an engine exhaust emission purification apparatus, which comprises: a reduction catalytic converter disposed in an engine exhaust system to reduce and purify nitrogen oxides by using a liquid reducing agent; an injection nozzle for supplying the liquid reducing agent by injection to the emission at a position upstream the reduction catalytic converter; and a temperature maintenance device for maintaining a temperature of at least a part of a liquid reducing agent supply system provided with the injection nozzle and the piping of the nozzle at a temperature lower than a boiling point of a solvent of the liquid reducing agent or equal to or higher than a melting point of dissolved matter.

The temperature maintenance device may be formed of a heat insulating member disposed between the exhaust system and a flange for mounting the injection nozzle to the exhaust system, may be formed of radiating fins provided to be juxtaposed to the flange for attaching the injection nozzle to the exhaust system, or may be formed by routing a conduit for engine coolant, i.e., an engine coolant, to the flange for attaching the injection nozzle to the exhaust system so as to cause heat exchange between the flange and the engine coolant in the conduit.

Further, the temperature maintenance device may be formed by leading a conduit for engine coolant to at least a part of the liquid reducing agent supply system so as to cause heat exchange between the liquid reducing agent supply system and the engine coolant. At this time, a nozzle temperature detecting device for detecting a nozzle temperature of the injection nozzle and a circulation control device for circulating or intercepting the engine coolant in the conduit based on the nozzle temperature detected by the nozzle temperature detecting device are preferably provided. The engine coolant is circulated by flow when the nozzle temperature is equal to or higher than the boiling point of the solvent of the liquid reducing agent or lower than the melting point of the dissolved matter. Furthermore, it is preferable that a coolant temperature detecting device for detecting a temperature of the engine coolant is provided and that the circulation of the engine coolant by flow is prohibited when the coolant temperature detected by the coolant temperature detecting device is equal to or higher than the boiling point of the solvent of the liquid reducing agent.

On the other hand, the temperature maintenance device may include a heating device such as a heater for heating at least a part of the liquid reducing agent supply system and a heating control device for controlling the heating device. A heat insulating member may preferably be disposed around at least a part of the liquid reducing agent supply system and the heating device. At this time, it is preferable that a nozzle temperature detecting device for detecting a nozzle temperature of the injection nozzle is provided and that actuation of the heating device is controlled based on the nozzle temperature detected by the nozzle temperature detecting device. Moreover, at least a part of the liquid reducing agent supply system may preferably be heated to a temperature equal to or higher than the melting point of the dissolved matter of the liquid reducing agent by using the heating device when the injection supply of the liquid reducing agent is stopped.

With the exhaust emission purification apparatus according to the invention, at least a part of the liquid reducing agent supply system provided with the injection nozzle and the associated piping for the injection nozzle is maintained by the temperature maintenance device at a temperature either lower than the boiling point of the solvent of the liquid reducing agent or equal to or higher than the melting point of the dissolved matter. Therefore, the liquid reducing agent existing in the liquid reducing agent supply system implements heat exchange with the liquid reducing agent supply system to thereby be maintained at a temperature lower than the boiling point of the solvent or at a temperature equal to or higher than the melting point of the dissolved matter. Therefore, a phenomenon in which only the solvent evaporates in the liquid reducing agent supply system and the dissolved matter is precipitated does not occur. If the dissolved matter is precipitated, the dissolved matter melts away. As a result, clogging of an injection hole of the injection nozzle may be prevented. Because injection/supply failure of the liquid reducing agent is avoided, a required amount of liquid reducing agent according to an operating state of the engine can be injection-supplied to obtain necessary exhaust emission purification performance.

DESCRIPTION OF THE PREFERRED EMBODIMENT

The present invention will be described below in detail with reference to the accompanying drawings.

Figure 1:
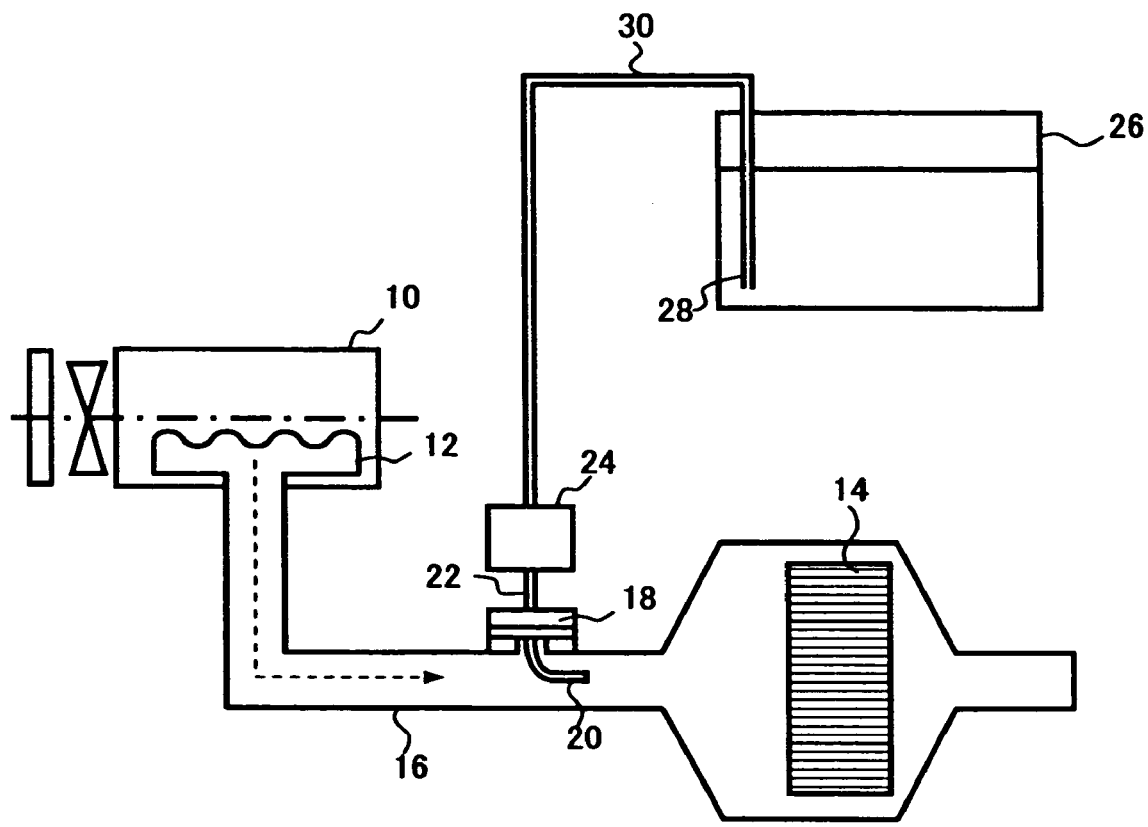
FIG. 1 shows a basic structure of an exhaust emission purification apparatus according to the present invention.

FIG. 1 shows a basic structure of an exhaust emission purification apparatus according to the invention. Exhaust emission from an engine 10 is emitted into the air from an exhaust pipe 16 in which a NOx reduction catalytic converter 14 is disposed through an exhaust manifold 12. Specifically, in the exhaust pipe 16, three catalytic converters, i.e., a nitrogen monoxide (NO) oxidation catalytic converter, a NOx reduction catalytic converter, and an ammonia slip oxidation catalytic converter are disposed in order from an upstream side of the flow of the exhaust emission, and a temperature sensor and so on are disposed in front and at the rear of the catalytic converters to thereby form an exhaust system. However, details are not illustrated for the simplicity sake.

In the exhaust pipe 16 located on the exhaust emission upstream side of the NOx reduction catalytic converter 14, an injection nozzle 20 is attached to the pipe 16, via a flange 18 fastened to a peripheral wall of the pipe 16. The injection nozzle 20 implements injection-supply of a liquid reducing agent to the exhaust emission flowing upstream side of the NOx reduction catalytic converter 14 and a tip end portion of the nozzle 20 is formed with an injection hole for spraying and injecting the liquid reducing agent. Piping 22 in fluid communication with the injection nozzle 20 is connected to the flange 18, and a reducing agent supply device 24 for supplying the liquid reducing agent is connected to the piping 22. To the exhaust emission upstream side of the NOx reduction catalytic converter 14, a required amount of liquid reducing agent according to an operating state of the engine is injection-supplied together with air from the reducing agent supply device 24 through the piping 22 and the injection nozzle 20. Although a urea aqueous solution is used as the liquid reducing agent in the present embodiment, an ammonia aqueous solution may be used (hereafter the same shall apply).

The urea aqueous solution injected and supplied from the injection nozzle 20 is hydrolyzed due to heat of the exhaust emission and water vapor in the exhaust emission and converted into ammonia. It is known that ammonia reacts with NOx in the exhaust emission within the NOx reduction catalytic converter 14 and converts and purifies the emission to water and harmless gas. The urea aqueous solution is an aqueous solution of solid or powder urea, introduced by suction from an inlet port 28 formed in a vicinity of a bottom portion of a storage tank 26 and supplied to the reducing agent supply device 24 via supply piping 30.

Here, the invention is provided with a temperature maintenance device for maintaining a temperature of at least a part of a urea aqueous solution supply system provided with the injection nozzle 20 and piping 22 for the nozzle at a temperature lower than a boiling point (100° C.) of a solvent (water) of the urea aqueous solution or equal to or higher than a melting point (132° C.) of dissolved matter (urea). Various embodiments of the temperature maintenance device will be described hereinbelow.

Figure 2:
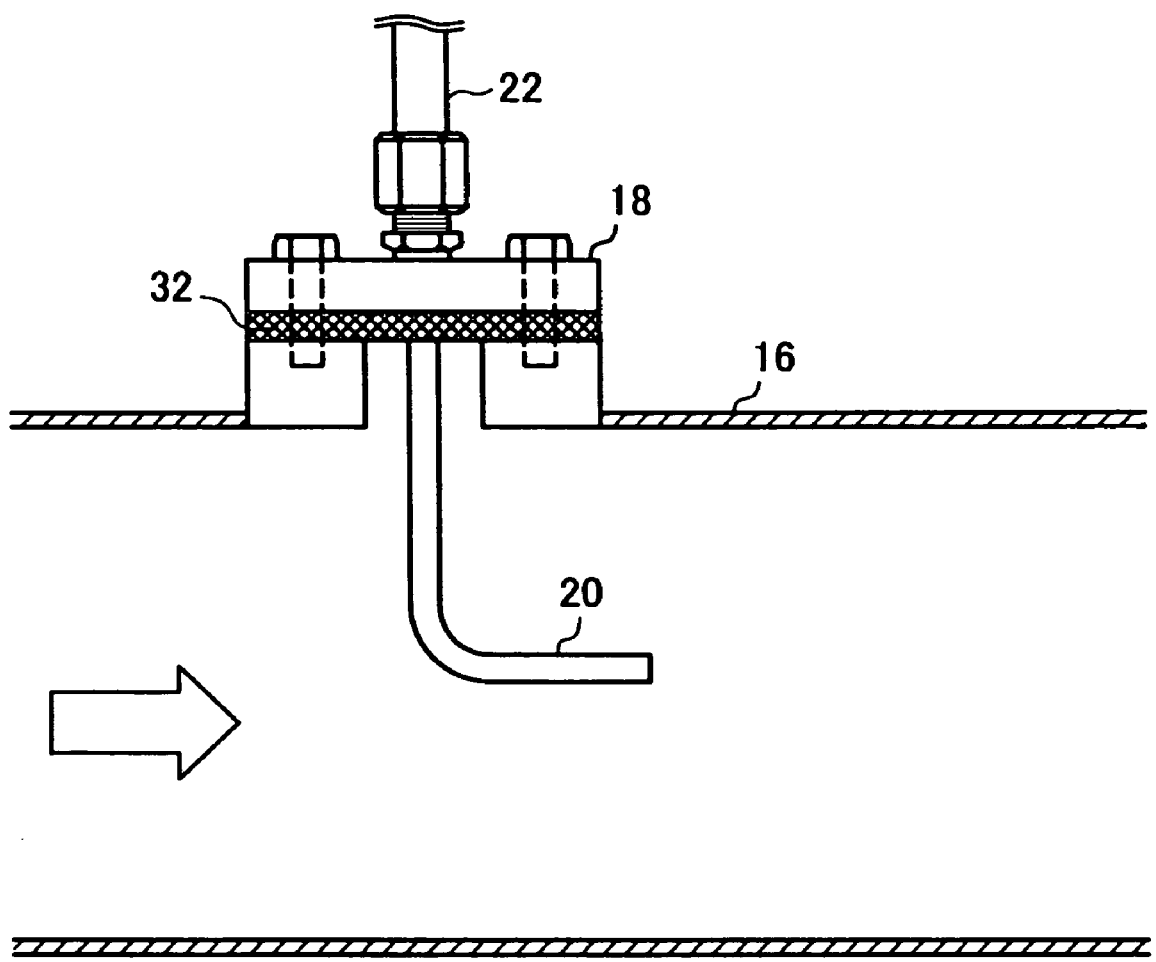
FIG. 2 is an explanatory view of a first embodiment of a temperature maintenance device.

FIG. 2 shows a first embodiment of the temperature maintenance device.

The temperature maintenance device is formed of a heat insulating member, e.g., a gasket 32 made of material with low thermal conductivity disposed between the exhaust pipe 16 and the flange 18. With this structure, heat of the exhaust emission from the engine 10 is insulated by the gasket 32 and therefore becomes less likely to be transferred to the flange 18. Then, increase in a temperature of the flange 18 is suppressed and the temperature is maintained at a temperature lower than the boiling point of water. As a result, the temperatures of the injection nozzle 20 and the piping 22 connected to the flange 18 become lower than the boiling point of water. Therefore, a phenomenon in which only moisture evaporates from the urea aqueous solution and urea is precipitated becomes less likely to occur to thereby avoid injection/supply failure of the urea aqueous solution caused by clogging of the injection hole of the injection nozzle 20. Therefore, a required amount of urea aqueous solution according to the operating state of the engine can be injection-supplied to obtain necessary exhaust emission purification performance.

Figure 3:
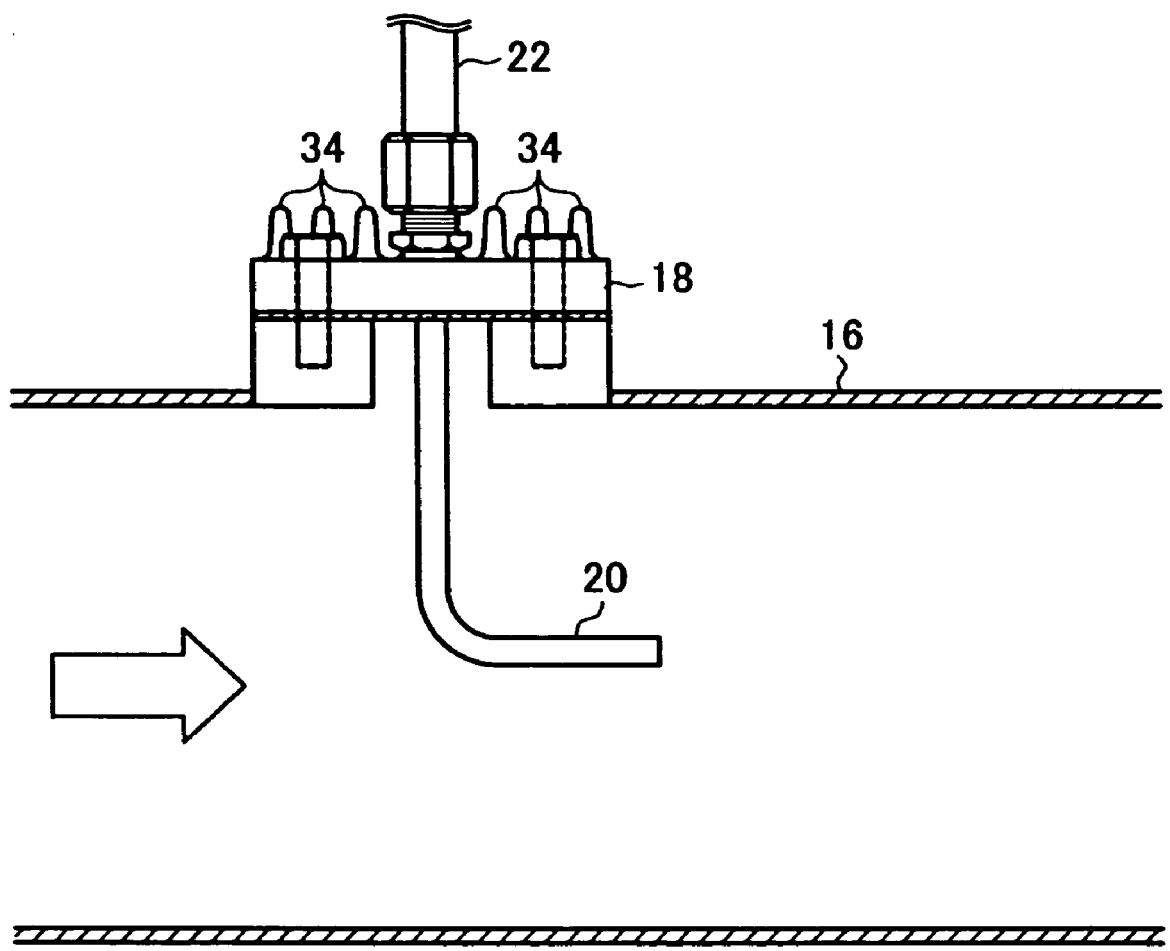
FIG. 3 is an explanatory view of a second embodiment of the temperature maintenance device.

FIG. 3 shows a second embodiment of the temperature maintenance device.

The temperature maintenance device is formed of a plurality of radiating fins 34 provided to be juxtaposed to an outer surface of the flange 18. With this structure, even when the exhaust heat of the engine 10 is transferred to the flange 18, the heat is radiated from the radiating fins 34 into the air to thereby suppress an increase in the temperature of the flange 18 and maintain the temperature at a temperature value lower than the boiling point of water. As a result, the temperatures of the injection nozzle 20 and the piping 22 connected to the flange 18 become lower than the boiling point of water to thereby exert similar advantageous effects to those exhibited by the preceding first embodiment.

Figure 4:
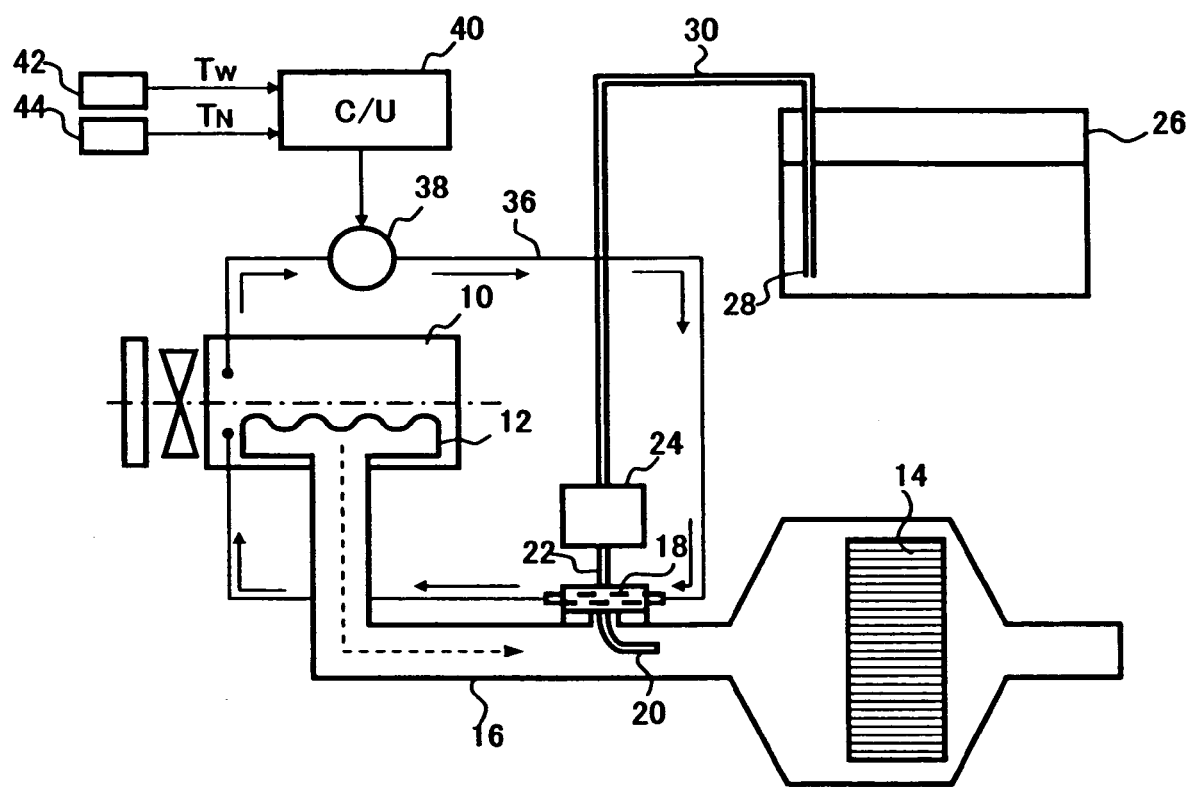
FIG. 4 is an explanatory view of a third embodiment of the temperature maintenance device.
Figure 5:
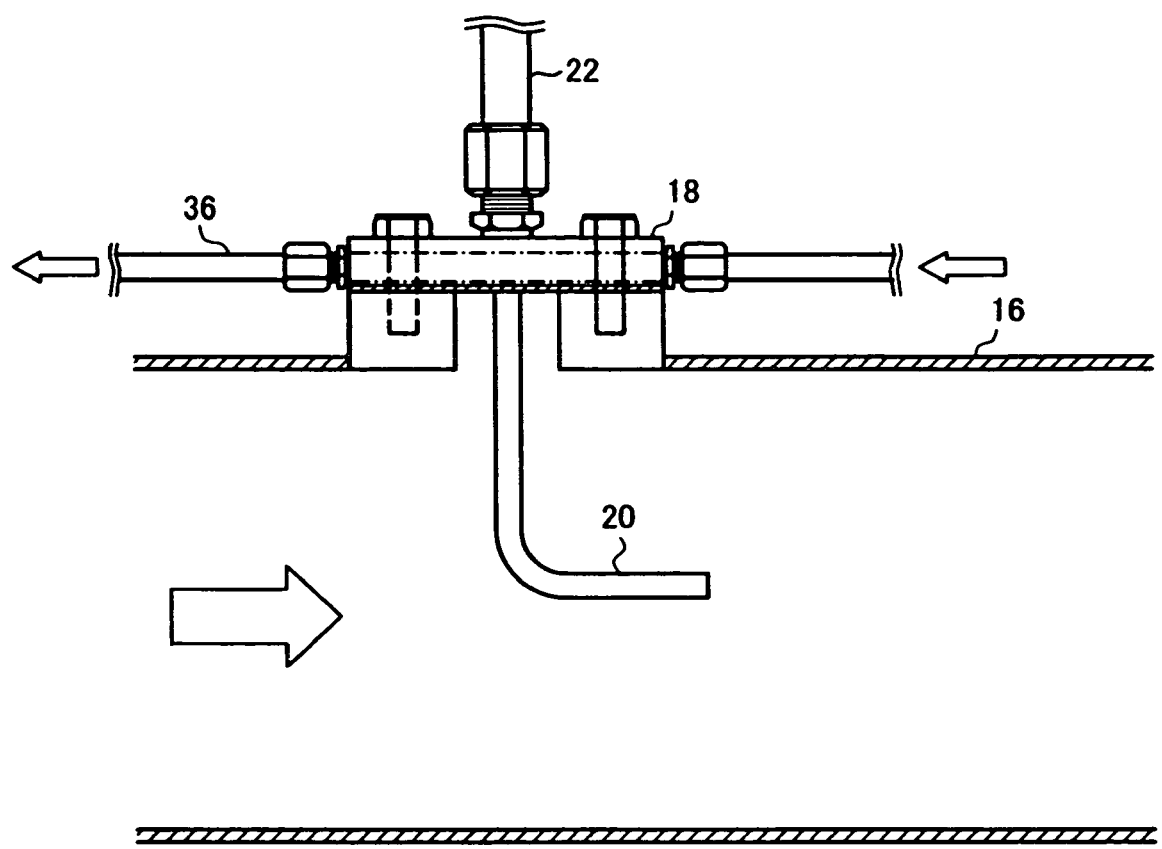
FIG. 5 is an enlarged view of an essential portion of the above.

FIGS. 4 and 5 show a third embodiment of the temperature maintenance device.

In the temperature maintenance device, a conduit 36 of engine coolant, i.e., engine coolant is led into the flange 18 so that the flange 18 and the engine coolant carries out heat exchange with each other. The conduit 36 is interposed with an electromagnetic opening/closing valve 38 for opening/closing a channel of the conduit 36 so as to circulate or intercept the engine coolant. A control unit 40 which has a built-in computer controls opening and closing of the opening/closing valve 38 based on detection signals from a coolant temperature sensor 42 (coolant temperature detecting device) for detecting a temperature $T_W$ of the engine coolant and a nozzle temperature sensor 44 (nozzle temperature detecting device) for detecting a nozzle temperature $T_N$ of the injection nozzle 20. Cooperation of the opening/closing valve 38 with the control unit 40, a circulation control device is formed.

Figure 6:
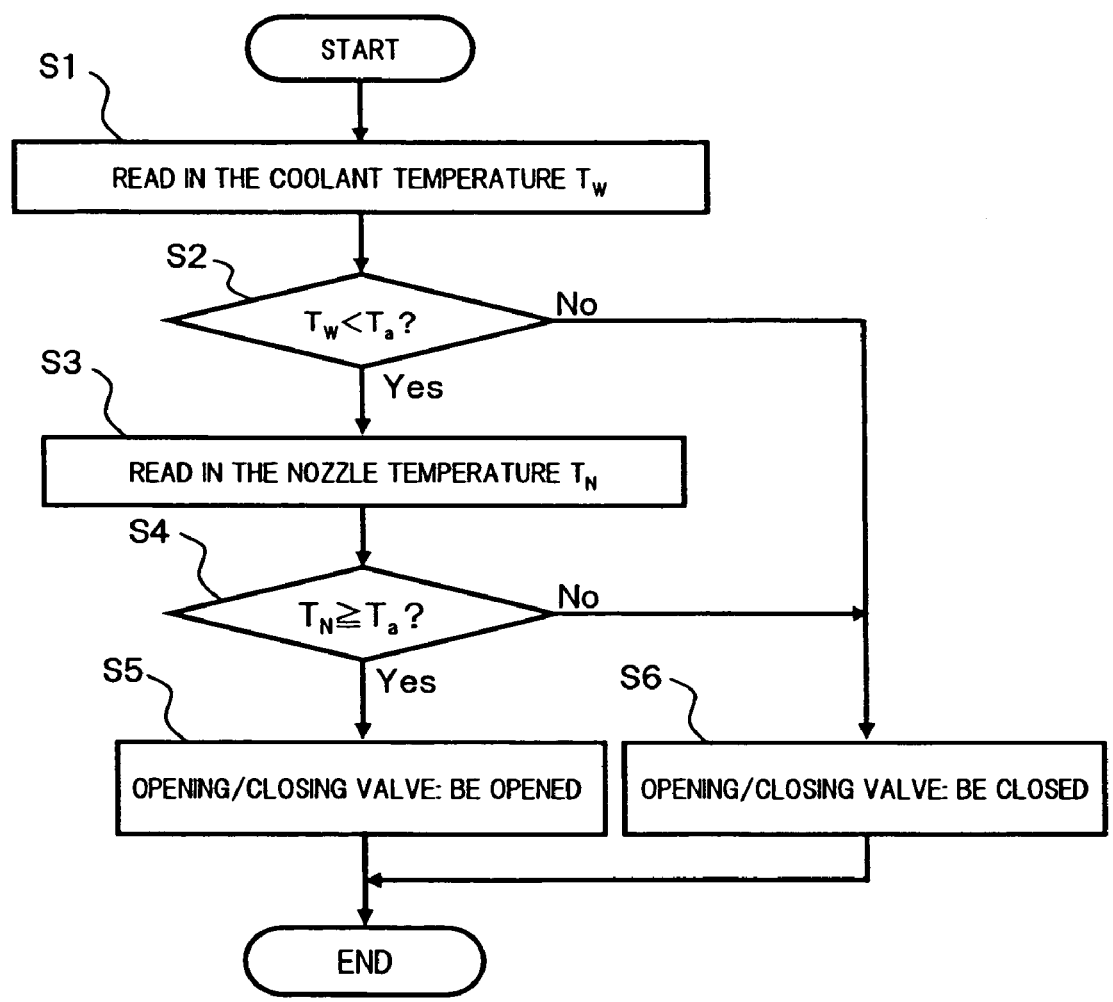
FIG. 6 is a flow chart showing contents of control of an opening/closing valve.

FIG. 6 shows contents of processing performed repeatedly every predetermined time in the control unit 40.

At step 1 (abbreviated as "S1" in the drawings and hereafter the same shall apply), the coolant temperature $T_W$ is read in from the coolant temperature sensor 42.

At step 2, whether the coolant temperature $T_W$ is lower than the boiling point $T_a$ of the water or not is determined. If the coolant temperature $T_W$ is lower than the boiling point $T_a$, the processing goes to step 3 (Yes). If the coolant temperature $T_W$ is equal to or higher than the boiling point $T_a$, the processing goes to step 6 (No).

At step 3, the nozzle temperature $T_N$ is read in from the nozzle temperature sensor 44.

At step 4, it is determined whether or not the nozzle temperature $T_N$ is equal to or higher than the boiling point $T_a$. If the nozzle temperature $T_N$ is equal to or higher than the boiling point $T_a$, the processing goes to step 5 (Yes) to open the opening/closing valve 38. On the other hand, if the nozzle temperature $T_N$ is lower than the boiling point $T_a$, the processing goes to step 6 (No) to close the opening/closing valve 38.

With this structure, when the nozzle temperature $T_N$, i.e., the temperature of the supply system of the urea aqueous solution is equal to or higher than the boiling point $T_a$ of water, the opening/closing valve 38 is opened and therefore the engine coolant maintained at about 80° C. is led to the flange 18. Therefore, because the flange 18 conducts heat exchange with the engine coolant, the temperature of the flange 18 is maintained at a temperature lower than the boiling point of water, specifically, about 80° C., even though the heat of the exhaust emission is transferred to the flange 18. At this time, if the coolant temperature $T_W$ is equal to or higher than the boiling point $T_a$, the opening/closing valve 38 is closed irrespective of the nozzle temperature $T_N$. Therefore, the high-temperature engine coolant is not led to the flange 18 to thereby prevent moisture from evaporating from the urea aqueous solution existing inside the injection nozzle 20 and the piping 22. As a result, the temperatures of the injection nozzle 20 and the piping 22 connected to the flange 18 become lower than the boiling point of water to thereby indicate similar advantageous effects to the preceding embodiments.

It is possible to exhibit similar advantageous effects by determining whether or not the nozzle temperature $T_N$ is lower than a melting point $T_b$ of urea instead of determining whether or not the nozzle temperature $T_N$ is equal to or higher than the boiling point $T_a$ of water. At this time, if the nozzle temperature $T_N$ is equal to or higher than the melting point $T_b$, the opening/closing valve 38 is closed and therefore, the engine coolant is not led to the flange 18 to thereby maintain the temperature of the flange 18 at a temperature value equal to or higher than the melting point $T_b$. Therefore, even if urea is precipitated in the injection nozzle 20 and the piping 22, urea melts to thereby avoid injection/supply failure of the urea aqueous solution caused by clogging of the injection hole of the injection nozzle 20 (hereafter the same shall apply).

Figure 7:
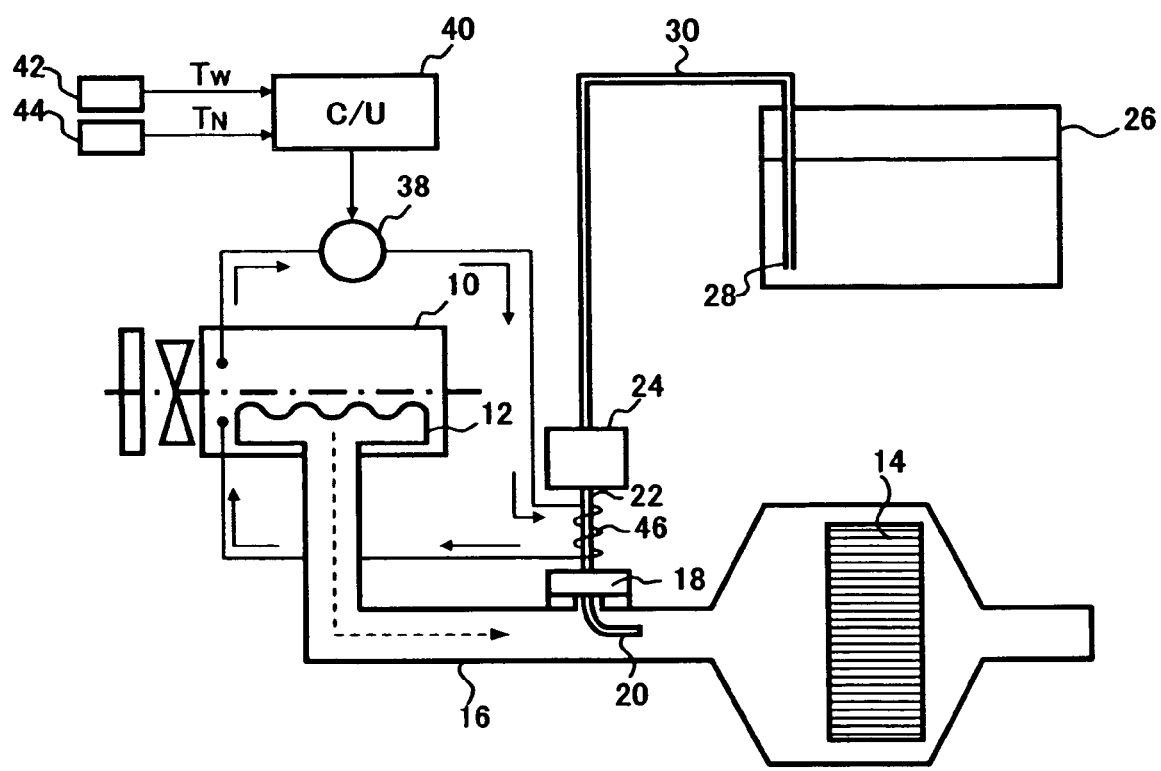
FIG. 7 is an explanatory view of a fourth embodiment of the temperature maintenance device.
Figure 8:
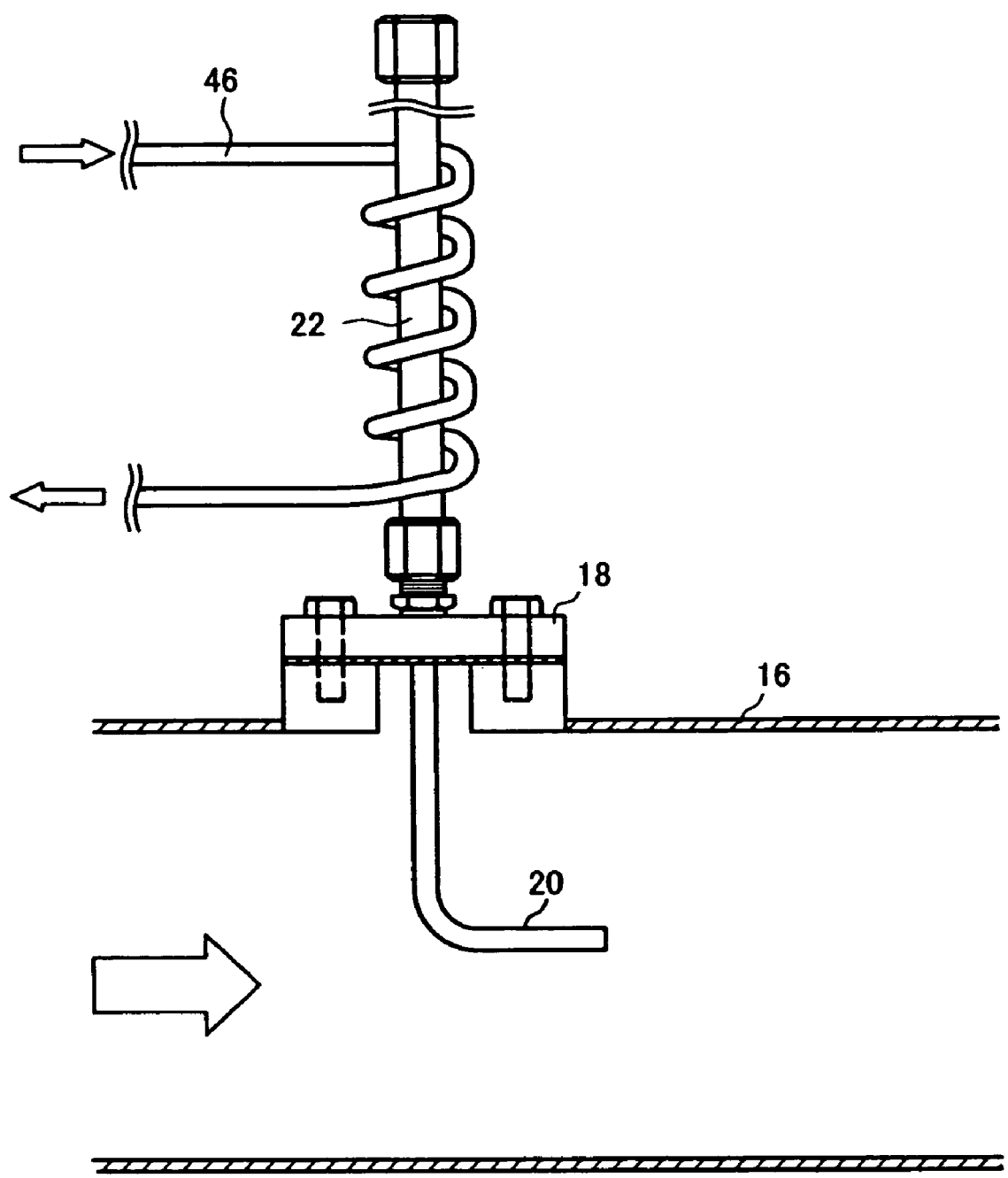
FIG. 8 is an enlarged view of an essential portion of the above.

FIGS. 7 and 8 show a fourth embodiment of the temperature maintenance device.

The temperature maintenance device is formed by spirally winding a conduit 46 of the engine coolant about at least a part of the supply system of the urea aqueous solution, e.g., a part of the piping 22 connected to the flange 18. Here, circulation control of the engine coolant is similar to that in the third embodiment.

With this structure, when the nozzle temperature $T_N$, i.e., the temperature of the supply system of the urea aqueous solution is equal to or higher than the boiling point $T_a$ of water, the opening/closing valve 38 is opened and therefore the engine coolant maintained at about 80° C. is led to a periphery of the piping 22. Therefore, since the piping 22 conducts heat exchange with the engine coolant, the temperature of the piping 22 is maintained at a temperature value lower than the boiling point of water, specifically, about 80° C. As a result, the temperatures of the piping 22 and the injection nozzle 20 in communication with and in connection to the piping 22 become lower than the boiling point of water so as to exhibit similar advantageous effects to the preceding embodiments.

Figure 9:
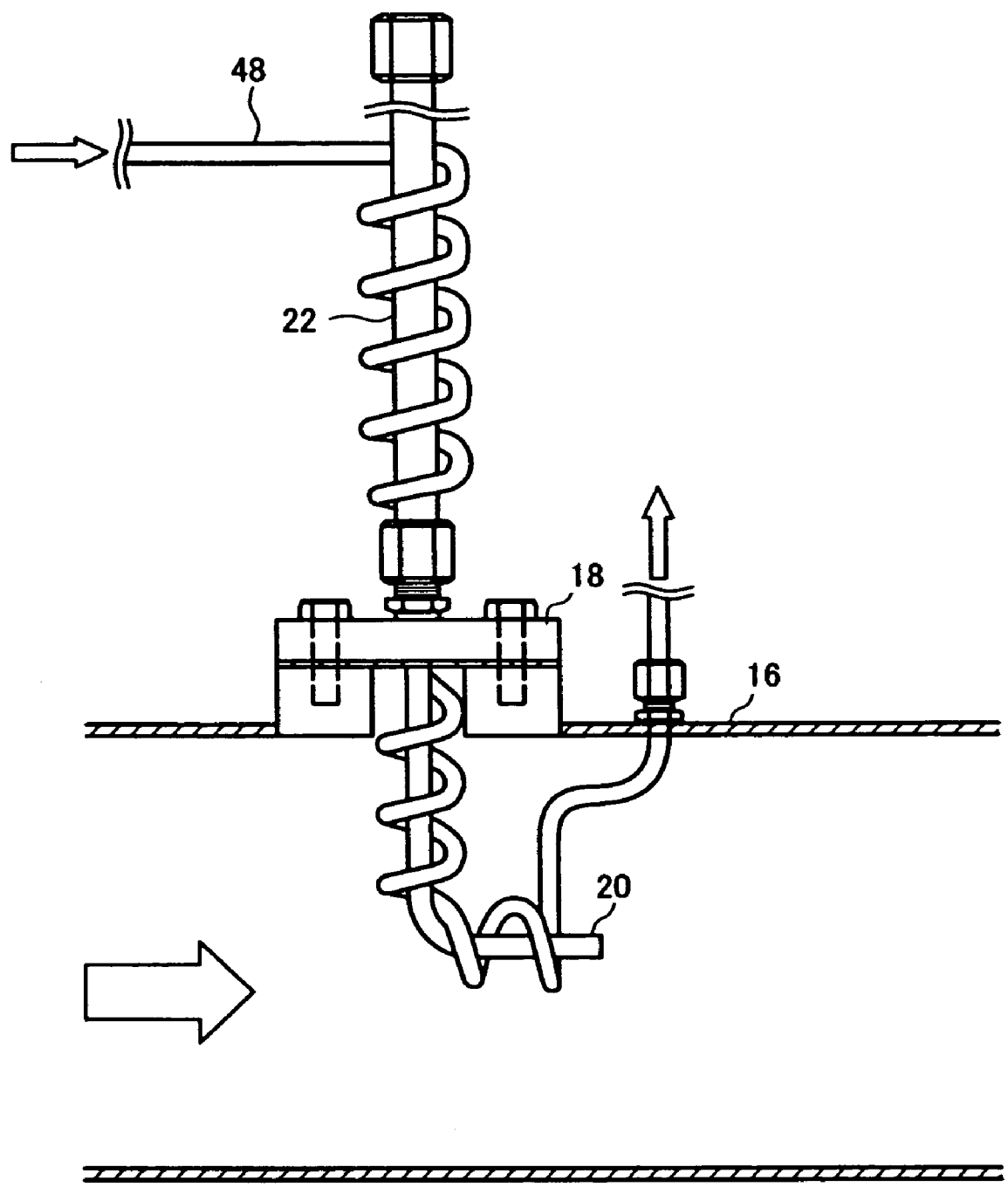
FIG. 9 is an explanatory view of a fifth embodiment of the temperature maintenance device.

FIG. 9 shows a fifth embodiment of the temperature maintenance device.

The temperature maintenance device of this fifth embodiment is configured by arranging a conduit 48 for the flow of the engine coolant to be spirally wound around at least a part of the supply system of the urea aqueous solution, i.e., an area from the piping 22 to the injection nozzle 20. Here, circulation control of the engine coolant is performed similarly to that performed in the third embodiment.

With this structure, when the nozzle temperature $T_N$, i.e., the temperature of the supply system of the urea aqueous solution is equal to or higher than the boiling point $T_a$ of water, the opening/closing valve 38 is opened and therefore, the engine coolant maintained at about 80° C. is led to peripheries of the piping 22 and the injection nozzle 20. Therefore, since the piping 22 and the injection nozzle 20 conduct heat exchange with the engine coolant, the temperatures of the piping 22 and the injection nozzle 20 are maintained at a temperature lower than the boiling point of water, specifically, about 80° C. As a result, the temperatures of the piping 22 and the injection nozzle 20 become lower than the boiling point of water to thereby exhibit similar advantageous effects to the preceding embodiments.

In the third to fifth embodiments, it is also possible to constantly circulate the engine coolant through the conduit 36, 46, or 48 without performing the control for circulating or intercepting the engine coolant by using the opening/closing valve 38. In this way, the supply system of the urea aqueous solution or the flange 18 conducts heat exchange with the engine coolant and therefore, the temperature of the supply system or the flange 18 is maintained at the temperature lower than the boiling point of water to thereby exhibit similar advantageous effects to the respective preceding embodiments.

In a cold season of a temperature lower than a freezing temperature at which the urea aqueous solution freezes, the supply system of the urea aqueous solution is heated by the engine coolant to thereby prevent freezing of the urea aqueous solution.

Figure 10:
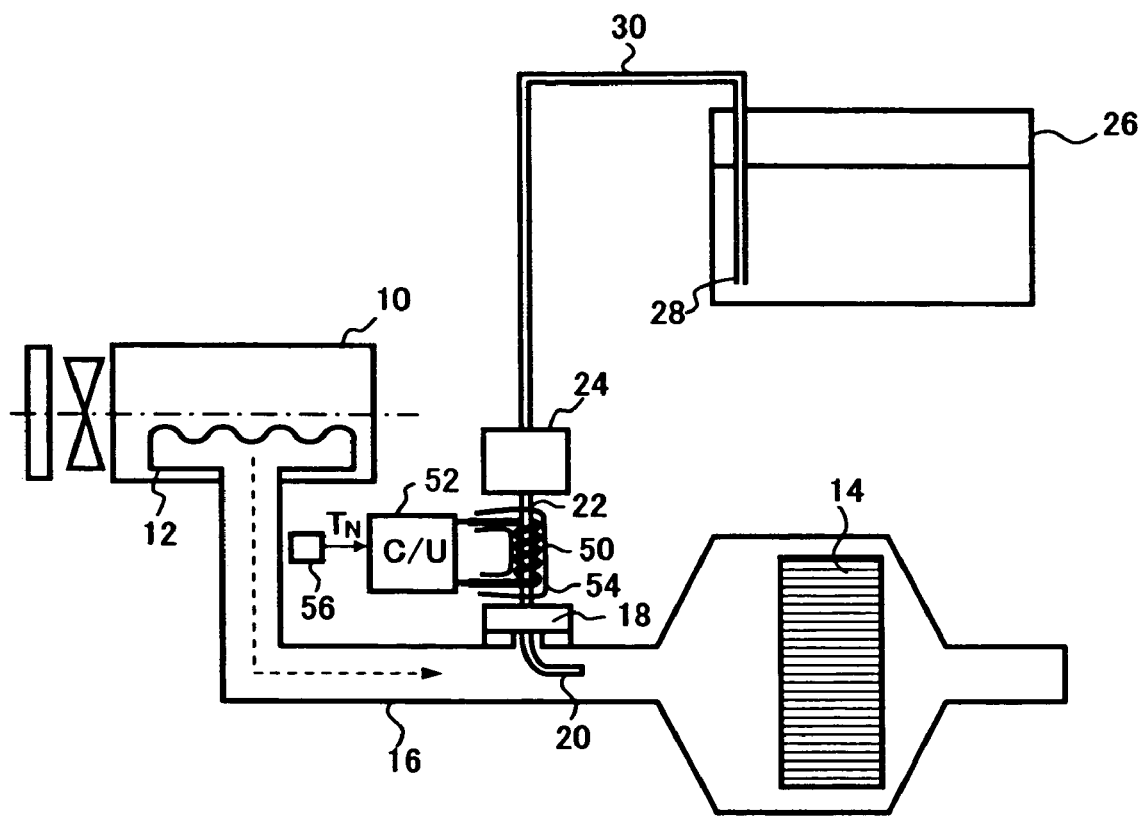
FIG. 10 is an explanatory view of a sixth embodiment of the temperature maintenance device.
Figure 11:
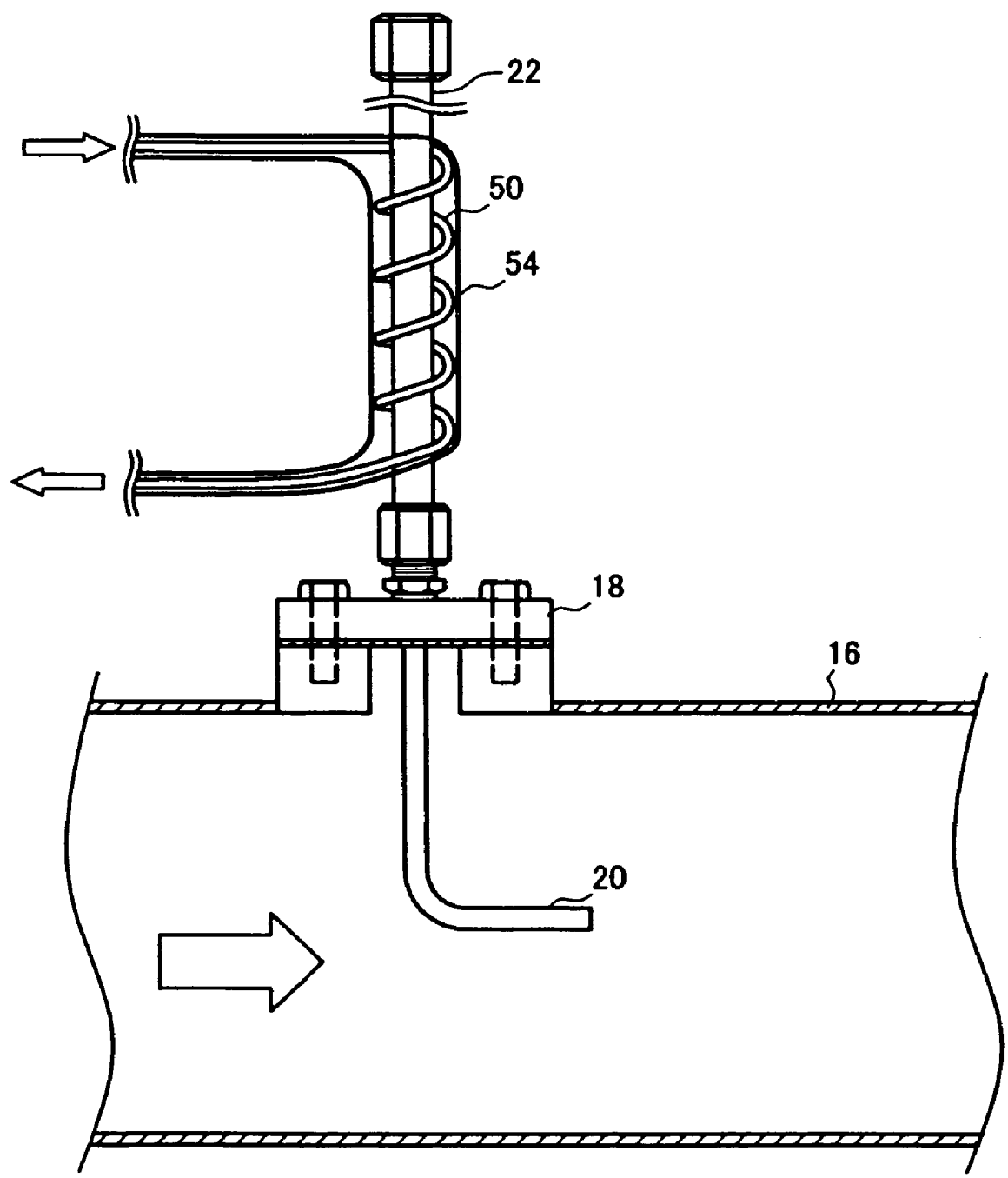
FIG. 11 is an enlarged view of an essential portion of the above.

FIGS. 10 and 11 show a sixth embodiment of the temperature maintenance device.

The temperature maintenance device includes a heater 50 (heating device) wound about at least a part of the supply system of the urea aqueous solution, e.g., a part of the piping 22 and a control unit 52 for controlling the heater 50. A heat insulating member 54 is disposed around at least the part of the piping 22 and the heater 50. The heat insulating member 54 is arranged to prevent heat radiation from the heater 50 toward outside, and is made of heat insulating material. The control unit 52 which has a built-in computer performs controlling of actuation of the heater 50, based on a detection signal from a nozzle temperature sensor 56 (nozzle temperature detecting device) for detecting the nozzle temperature $T_N$ of the injection nozzle 20.

Figure 12:
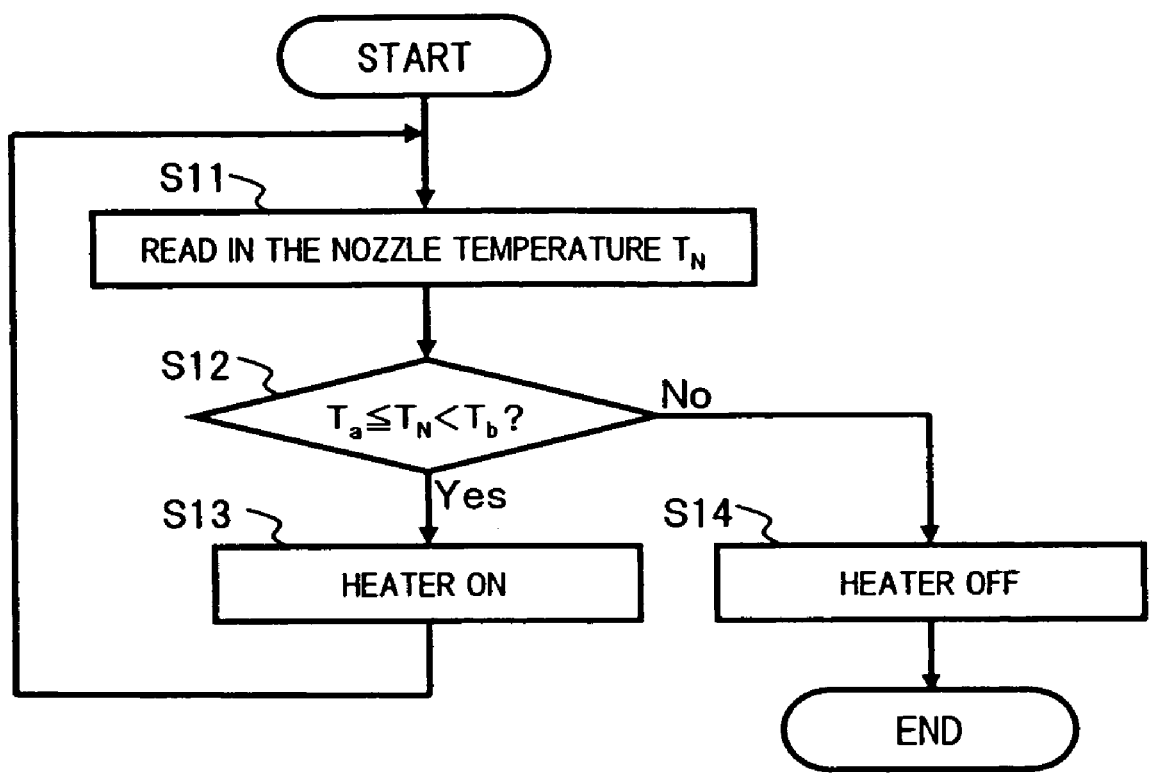
FIG. 12 is a flow chart showing contents of control of a heater.

FIG. 12 shows contents of processing performed repeatedly every predetermined time in the control unit 52.

At step 11, the nozzle temperature $T_N$ is read in from the nozzle temperature sensor 56.

At step 12, it is determined whether or not the nozzle temperature $T_N$ is equal to or higher than the boiling point $T_a$ of water and lower than the melting point $T_b$ of urea or not. If the nozzle temperature $T_N$ is equal to or higher than the boiling point $T_a$ and lower than the melting point $T_b$, the processing goes to step 13 (Yes) to actuate the heater 50 so as to increase the temperature of the supply system of the urea aqueous solution to or over the melting point $T_b$. If the nozzle temperature $T_N$ is lower than the boiling point $T_a$ or equal to or higher than the melting point $T_b$, the processing goes to step 14 (No) to stop the heater 50 so as to suppress unnecessary energy consumption, for example.

With this structure, if the nozzle temperature $T_N$, i.e., the temperature of the supply system of the urea aqueous solution is equal to or higher than the boiling point $T_a$ of water and lower than the melting point $T_b$ of urea, the heater 50 is actuated to thereby increase the temperature of the supply system. Then, when the temperature of the supply system of the urea aqueous solution reaches the melting point $T_b$, the urea precipitated in the supply system melts and is discharged from the injection hole of the injection nozzle 20. At this time, because at least a part of the piping 22 and the heater 50 are covered with the heat insulating member 54, heat generated by the heater 50 is trapped inside the heat insulating member 54 to thereby effectively heat the piping 22. Therefore, heating efficiency of the supply system of the urea aqueous solution is enhanced to thereby suppress energy consumption required for heating. On the other hand, if the nozzle temperature $T_N$ is lower than the boiling point $T_a$ of water, a phenomenon in which only moisture evaporates from the urea aqueous solution and urea is precipitated does not occur. If the nozzle temperature $T_N$ is equal to or higher than the melting point $T_b$ of urea, the precipitated urea naturally melts. Therefore, the heater 50 is stopped from a view point of suppression of unnecessary energy consumption.

Therefore, it is possible to maintain the supply system of the urea aqueous solution at a temperature at which the urea is not precipitated to thereby prevent injection/supply failure of the urea aqueous solution caused by clogging of the injection hole of the injection nozzle 20. Therefore, a required amount of urea aqueous solution according to the operating state of the engine can be injected and supplied to obtain necessary exhaust emission purification performance.

Figure 13:
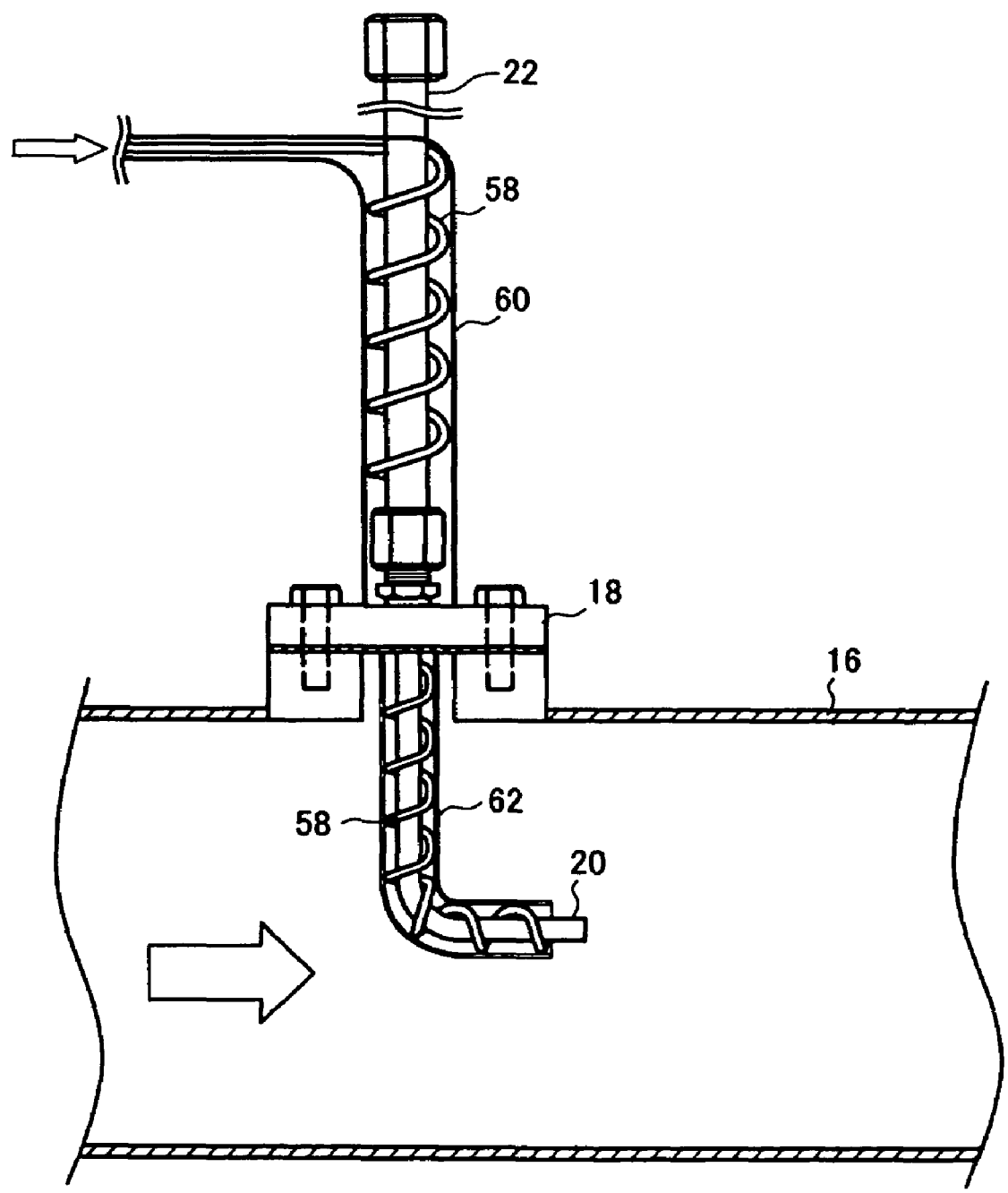
FIG. 13 is an explanatory view of a seventh embodiment of the temperature maintenance device.

FIG. 13 shows a seventh embodiment of the temperature maintenance device.

In the present embodiment, a heater 58 as the heating device is spirally wound about an area from the piping 22 to the injection nozzle 20. Here, around the heater 58, heat insulating members 60 and 62 are disposed so as to prevent heat generated by the heater 58 from radiating toward the outside. Control of actuation of the heater 58 is conducted similarly to that conducted in the sixth embodiment.

Operation and effects of this structure are similar to those of the sixth embodiment and therefore, description thereof will be omitted. However, as another effect, heat of the exhaust emission becomes less likely to be transmitted to the injection nozzle 20 by covering the heater 58 wound around the injection nozzle 20 with the heat insulating member 62.

In the sixth and seventh embodiments of the present invention, the control unit 52 may control the heater 50 or 58 so that the heater 50 or 58 heats at least a part of the supply system of the urea aqueous solution to or over the melting point $T_b$ of urea when injection and supply of the urea aqueous solution are stopped. In this way, a state in which the injection hole of the injection nozzle 20 is apt to become clogged can be prevented. More specifically, the supply system of the urea aqueous solution is heated to or over the melting point $T_b$ of urea immediately after stopping of the injection-supply of the urea aqueous solution and accordingly, precipitation of urea is suppressed to thereby successfully prevent clogging of the injection nozzle 20 for the urea aqueous solution.

As the temperature maintenance device according to the invention, not only each of the embodiments alone but also a combination of any two or more embodiments can be employed on condition that there is no technical contradiction. In this way, it is possible to effectively maintain the temperature of the supply system of the urea aqueous solution at the temperature at which the urea is not precipitated to thereby actually exert effects of the invention. In the invention, if a liquid reducing agent other than the urea aqueous solution is used, a boiling point $T_a$ of a solvent and a melting point $T_b$ of dissolved matter may be set properly according to a characteristic of the agent.

The exhaust emission purification apparatus according to the invention is extremely useful in that the supply system of the liquid reducing agent is maintained at the temperature at which the dissolved matter is not precipitated to thereby rarely make the injection hole of the injection nozzle to become clogged and obtain necessary exhaust emission purification performance.

We claim:

1. An engine exhaust emission purification apparatus comprising:
    a reduction catalytic converter disposed in an engine exhaust system to reduce and purify nitrogen oxides by using a liquid reducing agent;
    an injection nozzle that supplies by injection the liquid reducing agent to a flow of an exhaust emission upstream from the reduction catalytic converter;
    a nozzle temperature detecting device for detecting a nozzle temperature of the injection nozzle;
    a temperature maintenance device for maintaining a temperature of at least a part of a liquid reducing agent supply system including the injection nozzle and piping of the injection nozzle at a temperature lower than a boiling point of a solvent of the liquid reducing agent or equal to or higher than a melting point of dissolved matter, wherein the temperature maintenance device is arranged to route a conduit of engine coolant to a flange for attaching the injection nozzle to the exhaust system to thereby cause heat exchange between the flange and the engine coolant;
    a coolant temperature detecting device for detecting a coolant temperature of the engine coolant; and
    a circulation control device for controlling circulation or interception of the engine coolant in the conduit,
    wherein the circulation control device circulates the engine coolant when the detected nozzle temperature is equal to or higher than the boiling point of the solvent of the liquid reducing agent or lower than the melting point of the dissolved matter, and
    wherein the circulation control device prohibits a circulative flow of the engine coolant when the detected coolant temperature is equal to or higher than the boiling point of the solvent of the liquid reducing agent.

2. The engine exhaust emission purification apparatus according to claim 1, wherein the temperature maintenance device comprises a heat insulating member disposed between the exhaust system and the flange for attaching the injection nozzle to the exhaust system.

3. The engine exhaust emission purification apparatus according to claim 1, wherein the temperature maintenance device comprises radiating fins provided to be juxtaposed to the flange for attaching the injection nozzle to the exhaust system.

4. An engine exhaust emission purification apparatus comprising:
    a reduction catalytic converter disposed in an engine exhaust system to reduce and purify nitrogen oxides by using a liquid reducing agent;
    an injection nozzle that supplies by injection the liquid reducing agent to a flow of an exhaust emission upstream from the reduction catalytic converter;
    a nozzle temperature detecting device for detecting a temperature of the injection nozzle;
    a temperature maintenance device for maintaining a temperature of at least a part of a liquid reducing agent supply system including the injection nozzle and piping of the injection nozzle at a temperature lower than a boiling point of a solvent of the liquid reducing agent or equal to or higher than a melting point of dissolved matter, wherein the temperature maintenance device is arranged to lead a conduit for engine coolant to at least a part of the liquid reducing agent supply system to thereby cause heat exchange between the liquid reducing agent supply system and the engine coolant;
    a coolant temperature detecting device for detecting a temperature of the engine coolant and
    a circulation control device for controlling circulation or interception of the engine coolant in the conduit,
    wherein the circulation control device circulates the engine coolant when the detected temperature of the injection nozzle is equal to or higher than the boiling point of the solvent of the liquid reducing agent or lower than the melting point of the dissolved matter, and
    wherein the circulation control device prohibits circulative flow of the engine coolant when the detected temperature of the engine coolant is equal to or higher than the boiling point of the solvent of the liquid reducing agent.

5. The engine exhaust emission purification apparatus according to claim 4, wherein the temperature maintenance device comprises a heat insulating member disposed between the exhaust system and the flange for attaching the injection nozzle to the exhaust system.

6. The engine exhaust emission purification apparatus according to claim 4, wherein the temperature maintenance device comprises radiating fins provided to be juxtaposed to the flange for attaching the injection nozzle to the exhaust system.

* * * * *